US012671003B2

(12) United States Patent
Gouerec et al.

(10) Patent No.: US 12,671,003 B2
(45) Date of Patent: Jun. 30, 2026

(54) METHOD FOR MANUFACTURING A COATED NUCLEAR REACTOR COMPONENT HAVING A MARKING

(71) Applicant: FRAMATOME, Courbevoie (FR)

(72) Inventors: Thierry Gouerec, Pornichet (FR); Axel Aubry, Reze (FR)

(73) Assignee: FRAMATOME, Courbevoie (FR)

( * ) Notice: Subject to any disclaimer, the term of this patent is extended or adjusted under 35 U.S.C. 154(b) by 445 days.

(21) Appl. No.: 18/030,070

(22) PCT Filed: Oct. 4, 2021

(86) PCT No.: PCT/EP2021/077226
§ 371 (c)(1),
(2) Date: Apr. 3, 2023

(87) PCT Pub. No.: WO2022/073896
PCT Pub. Date: Apr. 14, 2022

(65) Prior Publication Data

US 2023/0352197 A1 Nov. 2, 2023

(30) Foreign Application Priority Data

Oct. 5, 2020 (FR) ................................ FR 20 10145

(51) Int. Cl.
*G21C 3/06* (2006.01)
*G21C 21/02* (2006.01)

(52) U.S. Cl.
CPC ............... *G21C 3/06* (2013.01); *G21C 21/02* (2013.01)

(58) Field of Classification Search
CPC .......... G21C 3/06; G21C 21/02; G21C 17/06; Y02E 30/30; C23C 4/14; C23C 4/16; C23C 16/0263; C23C 16/10; C23C 22/04; C23C 22/24; C23C 22/30; C23C 22/37; C23C 22/43; C23C 22/67
See application file for complete search history.

(56) References Cited

U.S. PATENT DOCUMENTS

| | | | |
|---|---|---|---|
| 4,822,987 A | 4/1989 | Goldenfield et al. | |
| 4,978,917 A * | 12/1990 | Goldenfield ........... | G21C 17/07 235/487 |
| 2008/0078960 A1 | 4/2008 | Ekberg | |
| 2013/0288024 A1 | 10/2013 | Clauter et al. | |
| 2014/0203460 A1 | 7/2014 | Lahoda et al. | |
| 2017/0287578 A1* | 10/2017 | Brachet ................. | C23C 14/165 |

FOREIGN PATENT DOCUMENTS

| | | |
|---|---|---|
| CN | 1751273 A | 3/2006 |
| CN | 103442904 A | 12/2013 |
| CN | 104919536 A | 9/2015 |
| CN | 110565143 A | 12/2019 |
| DE | 68915004 T2 | 11/1994 |

OTHER PUBLICATIONS

Sidelev et al., "Nickel-chromium (Ni—Cr) coatings deposited by magnetron sputtering for accident tolerant nuclear fuel claddings," Surface and Coatings Technology 369 (2019) 69-78. (Year: 2019).*
International Search Report for PCT/EP2021/077226.
French Search Report for FR.

* cited by examiner

*Primary Examiner* — William P Fletcher, III
(74) *Attorney, Agent, or Firm* — Davidson Kappel LLC

(57) ABSTRACT

A manufacturing method provides a nuclear reactor component comprising a substrate and a coating covering a surface of the substrate. The manufacturing method comprises laser-marking a pattern on the surface of the substrate, the marking being carried out so as to form recessed reliefs outlining the pattern in the surface of the substrate, and then applying the coating to the surface of the substrate over the pattern.

19 Claims, 7 Drawing Sheets

METHOD FOR MANUFACTURING A COATED NUCLEAR REACTOR COMPONENT HAVING A MARKING

The present disclosure relates to the field of manufacturing nuclear reactor components, and in particular nuclear fuel rods.

BACKGROUND

During the manufacture of a nuclear reactor component, it is necessary to ensure traceability, in order to be able to identify the origin of a possible malfunction.

A nuclear fuel assembly for use in a nuclear reactor typically comprises a bundle of nuclear fuel rods, each nuclear fuel rod comprising a cladding containing nuclear fuel, the cladding being formed of a tube closed at both ends by a plug.

The cladding tube of a nuclear fuel rod may be formed from a tubular substrate, the outer surface of which is covered with a coating to protect the substrate from the particularly aggressive environment inside a nuclear reactor.

To ensure traceability of a nuclear fuel rod cladding tube, it is possible to laser-mark the substrate so that an individual identification code is printed on the substrate by oxidation.

However, the colouring achieved by laser marking is usually accompanied by oxidation of the substrate, which can lead to weakening of the substrate, and thus the nuclear fuel rod.

In addition, the application of a protective coating masks the marking made by colouring the substrate when the coating subsequently applied to the substrate is non-transparent, as is the case for example with a metallic coating.

In order to allow traceability of the cladding tube throughout the nuclear fuel rod manufacturing method, it is possible to mark the individual identification code on a sacrificial end portion of the substrate, coat the substrate with the coating without coating the sacrificial end portion, mark the individual identification code on a coated portion of the tube, and then cut off the sacrificial portion of the substrate.

However, this requires additional cutting of the sacrificial portion and marking of the coated substrate, and there remains a risk of error, particularly a risk of mismatch between the individual identification code on the sacrificial portion of the substrate prior to coating, and the individual identification code on the coating over the substrate.

SUMMARY

One of the aims of the present disclosure is to provide a method of manufacturing a nuclear reactor component with a marking, for example a nuclear fuel rod, which is easy to implement while at the same time providing traceability in a reliable and easy manner.

To this end, the present disclosure provides a method for manufacturing a nuclear reactor component comprising a substrate and a coating covering a surface of the substrate, the manufacturing method comprising laser-marking a pattern on the surface of the substrate, the marking being carried out so as to form recessed reliefs drawing the pattern into the surface of the substrate, and then applying the coating to the surface of the substrate over the pattern.

In particular embodiments, the method for manufacturing comprises one or more of the following optional features:

- the marking is made in such a way that the pattern is readable before and after the coating is applied;
- the depth of the recessed reliefs drawing the pattern is less than 5 μm;
- the pattern comprises at least one series of lines drawing a readable identification code, each line being formed by a plurality of dots and/or dashes;
- the pattern comprises at least one code, for example a barcode, a matrix code and/or an alphanumeric code;
- the laser-marking is carried out by pulses, preferably with a pulse frequency of between 5 kHz and 2 MHz, a power of between 18 W and 22 W, a pulse width of between $200\times10^{-15}$ s and $50\times10^{-12}$ and/or a scanning speed of between 200 mm/s and 2,000 mm/s, so as to achieve a topographical contrast sufficient to ensure the legibility of the pattern before and after the application of the coating;
- the substrate is metallic;
- the substrate is made of a zirconium-based material;
- the coating is metallic or is an oxide;
- the coating is made of a chromium-based material;
- the coating is made of an oxide, for example an oxide of the type $ZrO_2$ or $CrO_2$;
- the nuclear reactor component is a tube, the substrate having a tubular shape and the surface marked with the pattern and covered by the coating being the outer surface of the tubular shaped substrate;
- the nuclear reactor component is a cladding tube, for example a nuclear fuel rod cladding tube or a control rod cladding tube.

BRIEF SUMMARY OF THE DRAWINGS

The present disclosure and its advantages will become apparent upon reading the following description, given only as a non-limiting example, referring to the attached drawings, in which.

DETAILED DESCRIPTION

Figure 1:
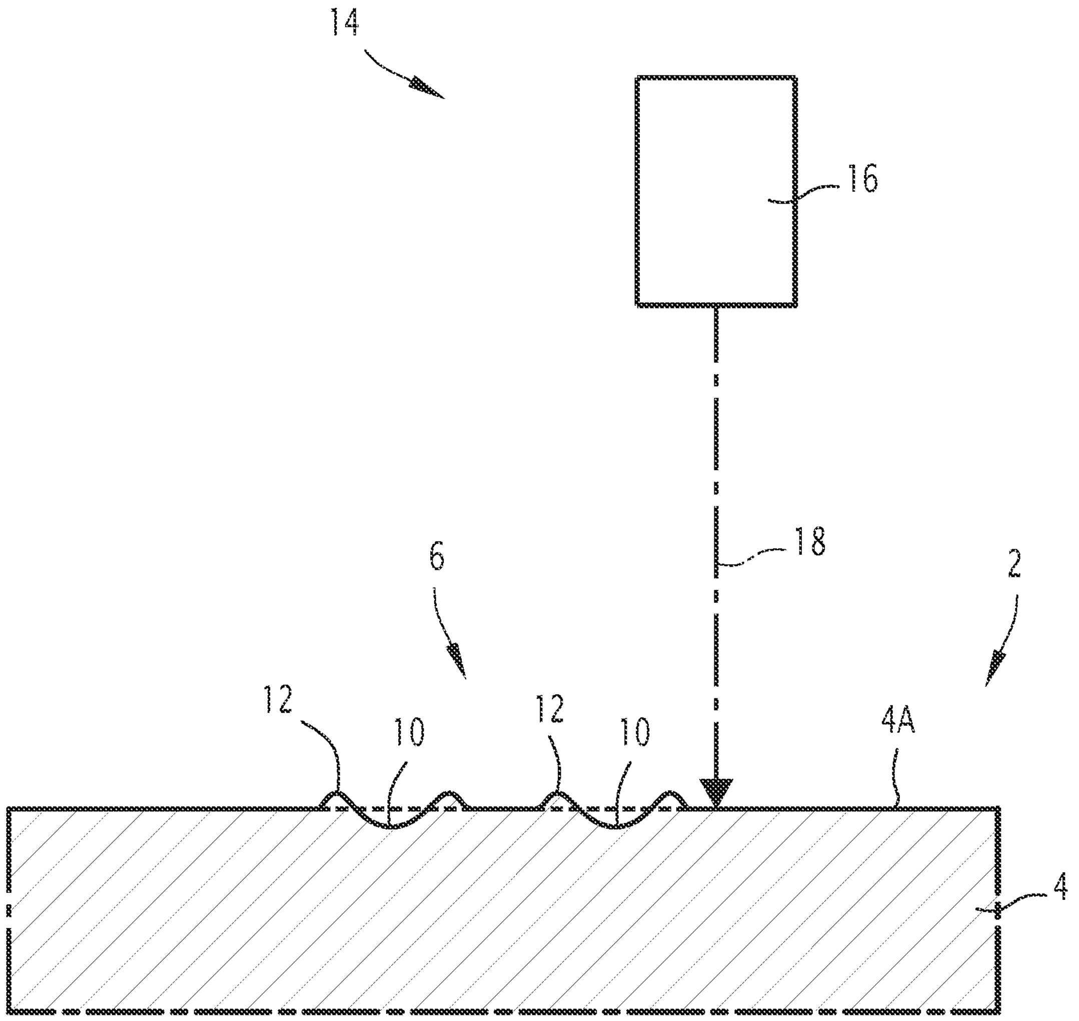
FIG. 1 illustrates a step of marking a surface of a substrate of a nuclear reactor component carried out during a method for manufacturing this nuclear reactor component.
Figure 2:
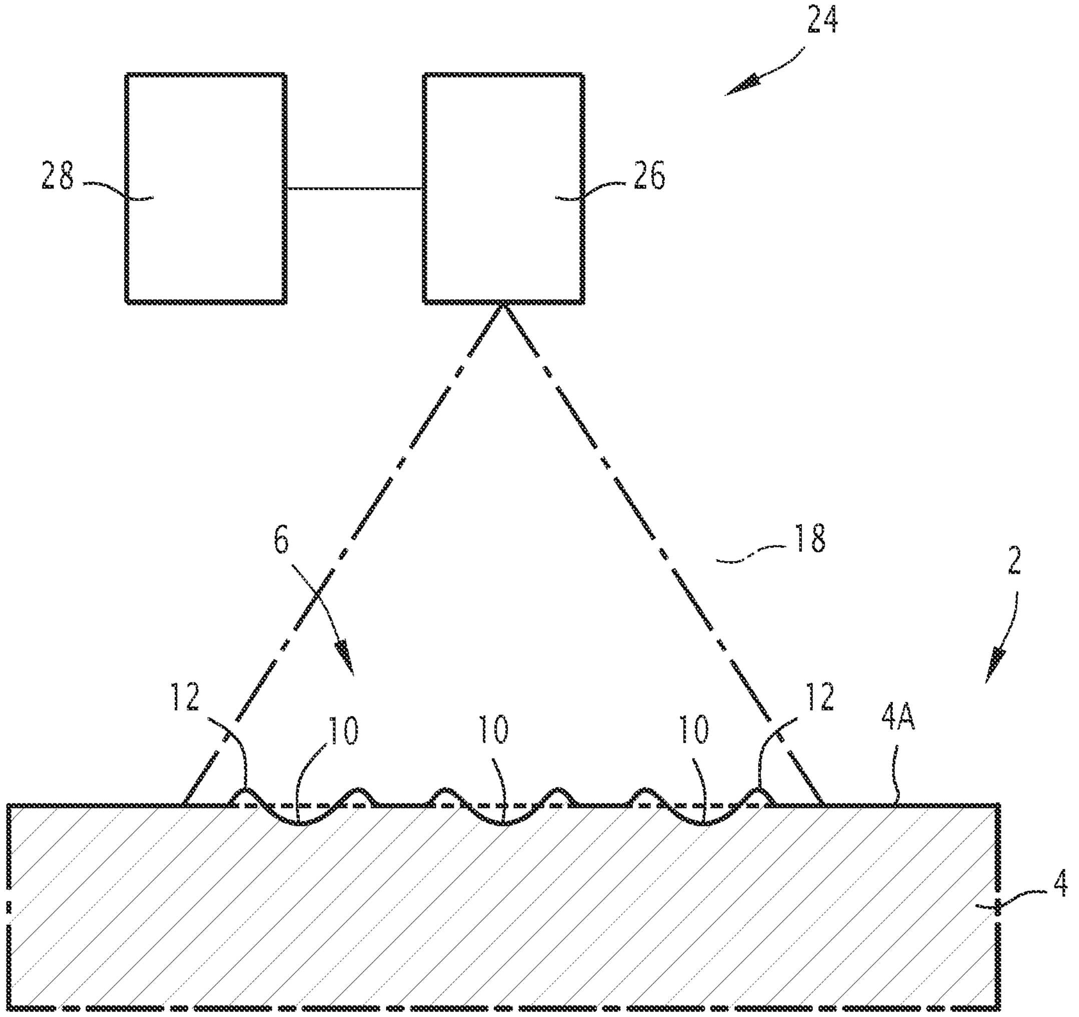
FIG. 2 illustrates a step of automatically reading the marking performed during the manufacturing method.
Figure 3:
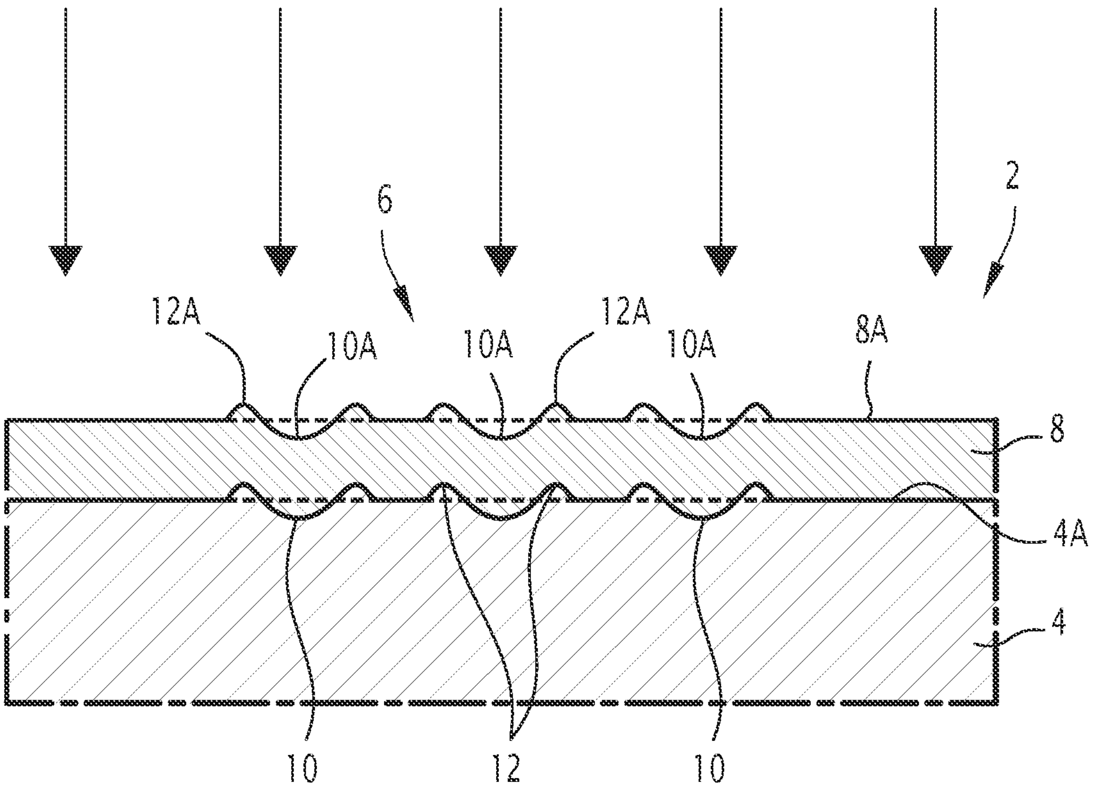
FIG. 3 illustrates a step of applying a coating to the marked substrate, performed during the manufacturing method.
Figure 4:
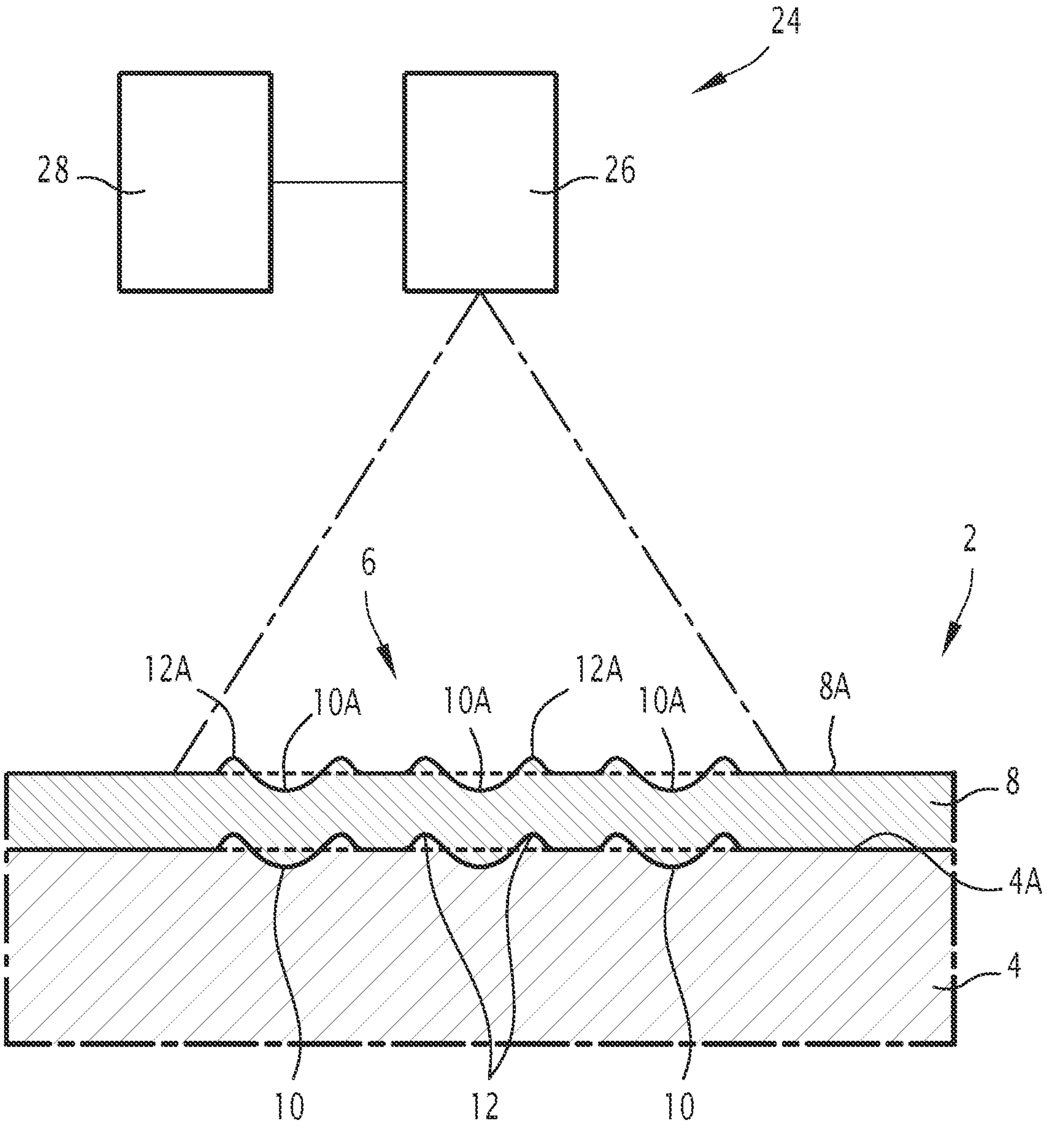
FIG. 4 illustrates a step of automatically reading the marking performed during the manufacturing method.

FIGS. 1 to 4 illustrate a method for manufacturing a nuclear reactor component 2 comprising a substrate 4 provided with a coating 8, the method successively comprising:

- a step of laser-marking the substrate 4 comprising marking a pattern 6 on a surface 4A of the substrate 4 (FIG. 1),
- optionally, at least one step of automatically reading the pattern 6 (FIG. 2),
- a step of applying the coating 8 to the surface 4A of the substrate 4, the coating 8 covering the pattern 6 (FIG. 3), and, optionally, a step of automatically reading the pattern 6 after applying the coating 8 (FIG. 4).

The marking of the pattern 6 and the application of the coating 8 are carried out in such a way that the pattern 6 is readable, preferably automatically, before the application of the coating 8 (FIG. 2) and after the application of the coating 8 (FIG. 4).

The pattern 6 is, for example, an individual identification code to ensure the traceability of the nuclear component 2. Thus, the pattern 6 marked on the substrate 4 before applying the coating 8, is readable before applying the coating 8 to identify the uncoated substrate 4, and after applying the coating 8 to identify the substrate 4 once it has been coated with the coating 8.

The marking of the pattern 6 is done in such a way that the marking locally increases the roughness of the surface 4A of the substrate 4.

The marking is carried out in such a way that the pattern 6 is in the form of recessed reliefs 10, and optionally protruding reliefs 12, formed on the surface 4A of the substrate 4.

The marking is therefore made in such a way that the pattern 6 can be read before and after the application of the coating 8 by topographical contrast.

The expression "topographical contrast" means that the recessed reliefs 10, and optionally the protruding reliefs 12, generated by the marking have surfaces with different orientations which cause differences in contrast, thus allowing the pattern 6 to be read, in particular by automatic reading.

The substrate 4 is for example a metallic substrate, i.e. a substrate 4 made of a metallic material.

The substrate 4 is for example made of a zirconium-based material.

In the present context, a zirconium-based material means a pure zirconium material or a zirconium-based alloy.

A pure zirconium material is a material comprising, by weight, at least 99% zirconium. A zirconium-based alloy is an alloy comprising, by weight, at least 95% zirconium.

In one embodiment, the zirconium-based material of the substrate 6 is a zirconium-based alloy containing, by weight, 0.8 to 1.8% niobium, 0.2 to 0.6% tin and 0.02 to 0.4% iron, the balance being zirconium and unavoidable impurities.

The substrate 4 is for example tubular in shape, the surface 4A marked in the marking step being the outer surface of the tubular substrate 4. Depending on the nuclear reactor component, the substrate 4 may have another shape, for example a plate shape.

The marking step (FIG. 1) is carried out automatically, using a laser marking machine 14 comprising a laser 16 suitable for generating a laser beam 18 directed onto the surface 4A on which the pattern 6 is to be marked.

In a known manner, the laser marking machine 14 is configured to move the laser beam 18 relative to the substrate 4 so as to mark the surface 4A forming the pattern 6.

The laser marking machine 14 is for example configured to move the laser beam 18 with the substrate 4 remaining stationary, or to move the substrate 4 with the laser beam 18 remaining stationary, or to move both the laser beam 18 and the substrate 4, moving them relative to each other.

In one embodiment, the laser marking is carried out by pulses with a pulse frequency and parameters defined so as to achieve a topographical contrast sufficient to ensure the readability of the pattern 6, preferably automatically, before and after application of the coating 8.

In one embodiment, laser marking is performed with a pulse frequency of between 5 kHz and 2 MHz, a laser power of between 18 W and 22 W, a pulse width of between $200\times10^{-15}$ s and $50\times10^{-12}$ s and/or a scan speed of between 200 mm/s and 2000 mm/s.

Compliance with each of these parameters, especially when they are taken in combination, makes it possible to produce an appropriate marking, forming recessed and/or protruding reliefs that allow the marking to be read before the coating 8 is applied and after the coating 8 is applied.

The pattern 6 is for example an individual identification code, i.e. is a unique code to individually identify the substrate 4, distinguishing it from other substrates. The laser marking machine 14 is configured to mark a specific code on each substrate 4, the code being different from one substrate to another.

The pattern 6 comprises, for example, a barcode, a matrix code and/or an alphanumeric code. A matrix code is for example a QR code.

In a particular embodiment, the pattern 6 comprises a bar code, i.e. a code formed by a plurality of parallel bars. Coding is a result of the number of bars, the width of the bars and/or the spacing between the bars.

Figure 5:
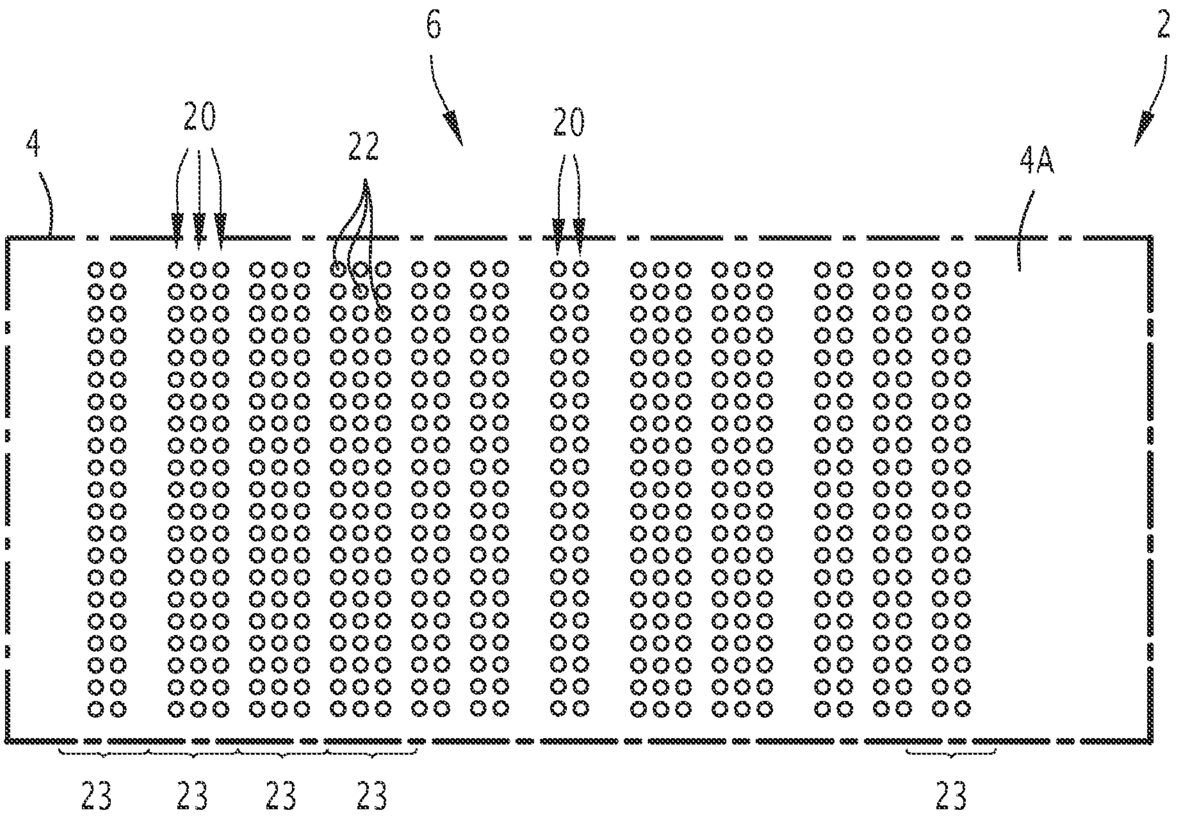
FIG. 5 shows a portion of the marking made during the marking step in front view.

In one embodiment, as shown in FIG. 5 showing the uncoated substrate 4 marked with the pattern 6, that pattern 6 comprises at least one line 20.

Each line 20 is for example a continuous line or a line formed by a line of dots and/or dashes, in particular a line formed by an alignment of dots 22, as shown in FIG. 5.

A line 20 formed of an alignment of dots 22 is for example formed by generating a laser beam 18 in pulses, each dot 22 being formed by a respective pulse, the laser beam 18 being moved relative to the substrate 4 to form the next dot 22 with the next pulse.

The marking of lines 20 formed by the alignment of dots 22 makes it possible to control the marking of the substrate 4, and in particular to control the depth of the recessed reliefs generated by the marking and the height of any protruding reliefs generated by the marking.

In a known way, it is possible to form thicker or thinner characters of an alphanumeric code by forming each element of the character (bar, leg, staff, etc.) using a line (thin character element) or several adjacent parallel lines (thick character element).

Similarly, it is possible to form wider or narrower bars of a barcode by forming each bar with one line (narrow bar) or several adjacent parallel lines (medium or wide bars).

The present disclosure enables a line 20 to be formed from an alignment of dots 22 so as to produce the necessary dashes or characters of thicknesses and widths as described above.

As illustrated in FIG. 5, which shows a portion of a bar code, each bar 23 is defined by a line 20 defining a narrow bar 23 or a plurality of adjacent lines 20 defining a wide bar. The more lines 20 in bar 23, the wider bar 23 is.

FIG. 5 shows, from left to right, a wide bar 23 formed of three lines 20, a thin bar 23 formed of one line 20, a wide bar 23 formed of three lines 20, and a medium bar 23 formed of two lines 20.

Figure 6:
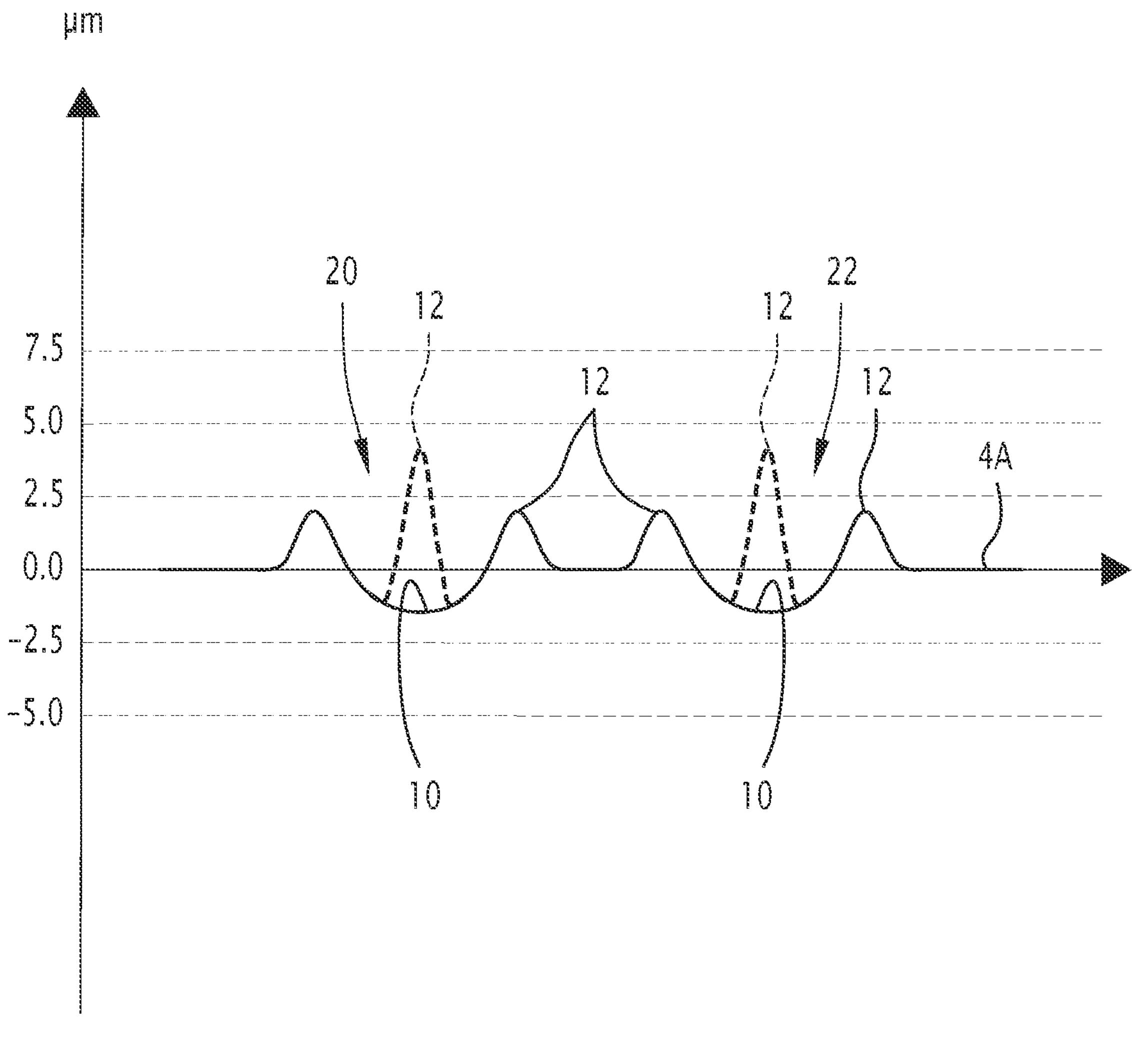
FIG. 6 shows a surface profile of the marked surface, taken along the line V-V in FIG. 5.

FIG. 6 is a surface profile of surface 4A along the line V-V in FIG. 5, the profile showing the depth/height of the recessed/protruding reliefs on the X-axis.

The marking is made in such a way as to generate recessed reliefs 10 with a depth of less than 5 μm, for example.

Preferably, the marking is made in such a way as to generate recessed reliefs 10 of a depth adapted to the thickness of the coating 8 which will be applied later.

The depth of the substrate relief is taken from the surface 4A in an area not affected by the marking.

These parameters allow a readable pattern 6 to be obtained before and after application of the coating 8, while preserving the substrate 4.

Preferably, the protruding reliefs 12 generated by the marking have a height of less than 10 μm.

The protruding reliefs 12 are generated by the material that was present at the location of the recessed reliefs 10.

The marking of a recessed relief can produce protruding reliefs that are less extensive than the recessed relief but have a height greater than the depth of the recessed relief.

The presence of protruding reliefs with a height greater than the depth of the recessed reliefs is not a problem, particularly for the strength of the substrate 4.

As shown in FIG. 6, each point 22 has a central area formed by a central recessed relief 10 and optionally a peripheral area formed by an annular raised relief 12 surrounding the central area. Each point 22 may furthermore optionally comprise an additional protruding relief 12 substantially in the centre of the central area, as shown in dotted line in FIG. 6.

Advantageously, the marking is carried out in such a way as to generate recessed reliefs having a depth greater than the roughness of the surface 4A of the substrate 4 before marking, and/or protruding reliefs having a height greater than the roughness of the surface 4A of the substrate 4 before marking.

Thus, the area of the surface 4A of the substrate 4 bearing the pattern 6 has a greater roughness than the rest of the surface 4A of the substrate 4.

In one example, the surface 4A has a roughness of between 0.1 and 0.3 microns before marking. The measurement is carried out, for example, with a roughness meter or a profilometer.

The coating step (FIG. 3) is carried out automatically using a coating machine (not shown).

In one example embodiment, the coating 8 has a thickness of between 5 μm and 25 μm.

The coating 8 is for example made of a chromium-based material.

In the present context, a chromium-based material means a pure chromium material or a chromium alloy.

A pure chromium material is a material comprising, by weight, at least 99% chromium. A chromium-based alloy is an alloy comprising, by weight, at least 85% chromium.

In one embodiment, the chromium-based material is a chromium-based alloy selected from: a binary chromium-aluminium (CrAl) alloy, a binary chromium-nitrogen (CrN) alloy, and a binary chromium-titanium (CrTi) alloy.

The topographical contrast achieved on the substrate 4 must be sufficient for the application of a coating 8 (e.g. by physical vapour deposition, in particular by physical vapour deposition by sputtering, even more in particular by magnetron sputtering) to maintain a contrast necessary for reading the pattern 6.

As shown in FIG. 3, after the coating 8 has been applied, the free surface 8A of the coating 8 has corresponding recessed reliefs 10A at the recessed reliefs 10 and, where appropriate, corresponding protruding reliefs 12A at the protruding reliefs 12.

Thus, the pattern 6 remains readable after the coating 8 has been applied.

Each automatic reading step (FIGS. 2 and 4) is carried out, for example, by means of an automatic reading machine 24 comprising a reading head 26 and a data processing unit 28 configured to read the pattern 6, in particular to decode the pattern 6 when it is a code.

The reading head 26 is for example an image capture device, such as a camera or a still camera, in which case the data processing unit 28 is configured to read the pattern 6 by image analysis. Alternatively, the reading head 24 is a scanner.

Reading the pattern 6 after the marking step ensures that the pattern 6 is readable before continuing the manufacturing method and/or ensures the traceability of the component after marking.

Reading the pattern 6 prior to the coating step 8 allows the substrate 4 to be identified before the coating 8 is applied.

In one embodiment, the manufacturing method comprises a machine reading step performed at the end of the marking step to ensure that the pattern 6 is readable, prior to storing the marked substrate and/or transferring it to the coating machine, and a machine reading step performed prior to the entry of the marked substrate 4 into the coating machine 8 to identify the substrate 4 prior to applying the coating 8 and ensure traceability during the manufacturing method.

Reading the pattern 6 after the coating step 8 ensures that the pattern 6 is readable after the coating 8 has been applied, prior to continuing the manufacturing method and/or ensuring traceability of the nuclear reactor component 2 substrate 4 after the coating 8 has been applied when the pattern 6, for example an individual identification code, allows for traceability.

It is possible to provide an automatic reading machine 24 for reading after marking, and another automatic reading machine 24 for reading before the coating 8 is applied.

The present disclosure makes it possible to manufacture a nuclear reactor component easily and reliably, ensuring traceability during the manufacturing method, thanks to the pattern 6, which is for example an individual identification code.

Only one marking operation is required and allows the pattern 6 to be read before and after the coating is applied.

The marking operation does not adversely affect the substrate 4 of the nuclear reactor component, and therefore does not affect the structural strength of the nuclear reactor component.

The present disclosure is not limited to the above mentioned embodiments, as other embodiments are possible.

In one example, the substrate 4 is metallic, in particular made of a zirconium-based material, and the coating 8 is metallic, in particular made of a chromium-based material.

Alternatively, the substrate 4 may be made of a non-metallic material, for example a composite material comprising a fibre-reinforced matrix, for example carbon fibre.

Alternatively, the coating 8 is made of a non-metallic material, in particular an oxide, for example an oxide of the type $ZrO_2$, $CrO_2$, etc.

An oxide can provide effective protection, particularly on a metallic substrate.

It is possible to combine a metallic substrate 4 with a metallic coating or a non-metallic coating or to combine a non-metallic substrate 4 with a metallic coating 8 or a non-metallic coating 8.

Figure 7:
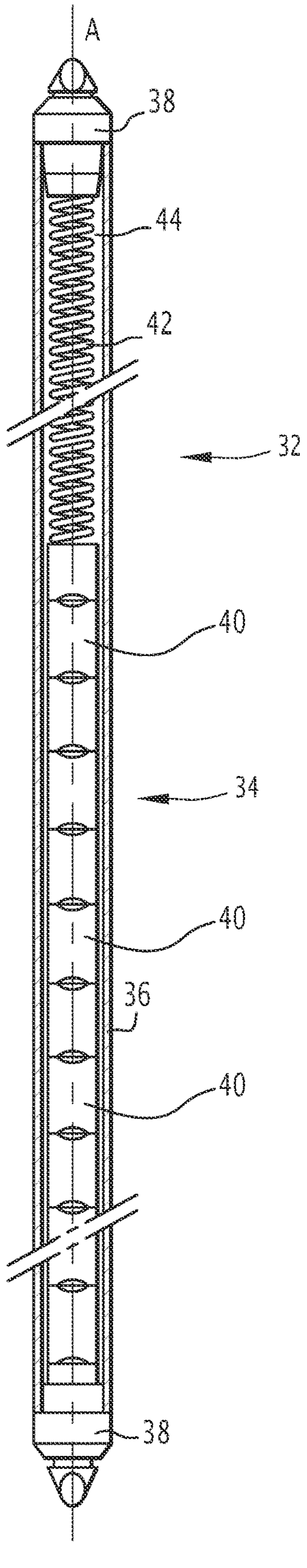
FIG. 7 is a cross-sectional view of a nuclear fuel rod having a cladding tube obtained by the manufacturing method illustrated in FIGS. 1 to 4.

FIG. 7 illustrates a nuclear fuel rod 30 intended for use in a light water reactor, in particular a Pressurized Water Reactor (PWR) or a Boiling Water Reactor (BWR), a WER reactor, a RMBK reactor or a heavy water reactor, such as a CANDU.

The nuclear fuel rod 32 has the shape of an elongated rod along a central axis A.

The nuclear fuel rod 32 comprises a cladding 34 containing nuclear fuel. The cladding 34 comprises a tube 36, each end of which has a plug 38 welded to the tube 36. The tube 36 extends along the central axis A of the nuclear fuel rod 32.

The tube 36 is a nuclear reactor component made according to the manufacturing method illustrated in FIGS. 1 to 6.

The tube 36 thus comprises a tubular substrate 4 coated with a coating 8, the substrate 4 being marked with the pattern 6 prior to application of the coating 8, the coating 8 then being applied over the pattern 6, the pattern 6 remaining readable after application of the coating 8.

The method for manufacturing the nuclear fuel rod 32 comprises, for example, manufacturing the tube 36 with its pattern 6 according to the manufacturing method illustrated in FIGS. 1 to 6, then inserting the nuclear fuel inside the tube 36 and closing the tube 36 with the plugs 38.

The nuclear reactor component is not necessarily a nuclear fuel rod cladding tube. It is possible to manufacture other nuclear reactor components.

In particular, it is possible to manufacture a control rod cladding tube. A control rod is intended to be inserted into the core of the nuclear reactor to control the reactivity of the core. A control rod differs from a nuclear fuel rod in that it contains neutron-absorbing material instead of nuclear fuel.

The reactor component is not necessarily tubular. It may have another form.

In particular, it is possible to manufacture a plate-shaped nuclear reactor component. Such a nuclear reactor component is for example a nuclear fuel cladding plate to form a plate-shaped nuclear fuel element comprising nuclear fuel sandwiched between two cladding plates. Such a nuclear fuel element is used for example in experimental nuclear reactors.

The pattern 6 is not necessarily a code, in particular an individual identification code. The pattern 6 may be a simple commercial marking or a code identifying the type of product.

What is claimed is:

1. A method for manufacturing a nuclear reactor component comprising a substrate and a coating covering a surface of the substrate, the manufacturing method comprising:

laser-marking a pattern on the surface of the substrate, the laser-marking being carried out so as to form recessed reliefs drawing the pattern into the surface of the substrate; and then applying the coating to the surface of the substrate over the pattern, the coating being made of a pure chromium material comprising, by weight, at least 99% of chromium or a chromium-based alloy comprising, by weight, at least 85% of chromium, a depth of the recessed reliefs being less than a thickness of the coating.

2. The manufacturing method according to claim 1, wherein the laser-marking is carried out in such a way that the pattern is readable before and after the coating is applied.

3. The manufacturing method according to claim 1, wherein the recessed reliefs drawing the pattern have a depth of less than 5 μm.

4. The manufacturing method according to claim 1, wherein the pattern comprises at least one series of lines drawing a readable identification code, each line being formed of a plurality of dots and/or dashes.

5. The manufacturing method according to claim 1, wherein the pattern comprises at least one code.

6. The manufacturing method according to claim 1, wherein the pattern comprises a bar code, a matrix code and/or an alphanumeric code.

7. The manufacturing method according to claim 1, wherein the laser-marking is performed by pulsing.

8. The manufacturing method according to claim 7, wherein the laser-marking is performed with a pulse frequency of between 5 kHz and 2 MHz, a power of between 18 W and 22 W, a pulse width of between $200\times10^{-15}$ s and $50\times10^{12}$ s, and/or a scanning speed of between 200 mm/s and 2000 mm/s, so as to achieve a topographical contrast sufficient to ensure a readability of the pattern before and after applying the coating.

9. The manufacturing method according to claim 1, wherein the substrate is metallic.

10. The manufacturing method according to claim 1, wherein the substrate is made of a zirconium-based material.

11. The manufacturing method according to claim 10, wherein the zirconium-based material contains, by weight, 0.8 to 1.8% niobium, 0.2 to 0.6% tin, and 0.2 to 0.4% iron, the balance being zirconium and unavoidable impurities.

12. The manufacturing method according to claim 1, wherein the coating is metallic or is an oxide.

13. The manufacturing method according to claim 1, wherein the coating is made of an oxide.

14. The manufacturing method according to claim 1, wherein the nuclear reactor component is a tube, the substrate having a tubular shape and the surface marked with the pattern and covered by the coating being an outer surface of the tubular-shaped substrate.

15. The manufacturing method according to claim 1, wherein the nuclear reactor component is a cladding tube.

16. The manufacturing method according to claim 1, wherein the nuclear reactor component is a nuclear fuel rod cladding tube or a control rod cladding tube.

17. The manufacturing method according to claim 1, wherein the depth of the recessed reliefs is less than 5 μm, the thickness of the coating being greater than 5 μm.

18. The manufacturing method according to claim 1, wherein the laser-marking is further carried out so as to form protruding reliefs drawing the pattern on the surface of the substrate.

19. The manufacturing method according to claim 18, wherein a height of the protruding reliefs is less than 10 μm.

* * * * *